Sept. 12, 1950  LE ROY V. JACOBSEN ET AL  2,522,039
BALANCING MEANS FOR MOTOR VEHICLE WHEELS
Filed July 7, 1947

INVENTOR.
L. V. JACOBSEN
BY G. G. GOSLINE
Merrill M. Blackburn
Atty.

Patented Sept. 12, 1950

2,522,039

UNITED STATES PATENT OFFICE 2,522,039

BALANCING MEANS FOR MOTOR VEHICLE WHEELS

Le Roy V. Jacobsen, near Bettendorf, Iowa, and Gilbert G. Go Sline, Rock Island, Ill., assignors to Bee-Line Company, Scott County, Iowa, a copartnership Application July 7, 1947, Serial No. 759,342

2 Claims. (Cl. 301—5)

Our present invention relates to means for application to a motor vehicle wheel to correct unbalance thereof, either static or dynamic. There are a number of wheel balance weights on the market which, like the structures in Turner Patents No. 2,202,129 and No. 2,221,747, are to be attached to the edge of the wheel rim but, with such structures, it is impossible to use decorative rims which are now very prevalent. There is another type of wheel balancing means in which the wheel-balancing weight is connected to a species of decorative rim but the weight, instead of being located near the edge of the rim, is located well inwardly toward the midplane of the wheel where it will have comparatively little influence in correcting dynamic unbalance.

One trouble with the conventional type of weight is its tendency to fly off from the rim when traveling at high speed, with consequent danger of injury to persons and property along the roadside. Among the objects of our invention, therefore, are the provision of a weight-supporting ring for motor vehicle wheels which will support a balancing weight or weights adjacent the outer edge of the rim flange where it will have the greatest effect in balancing the wheels; the provision of a ring which may serve as a decorative ring for the outer face of a motor vehicle wheel and may also serve to hold a balancing weight or weights in positions where they will have the greatest effect in the balancing of a wheel which is not properly balanced; the provision of a wheel-balancing weight and supporting means therefor which will hold the weight against detachment from the wheel rim when traveling rapidly; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Figure 1:
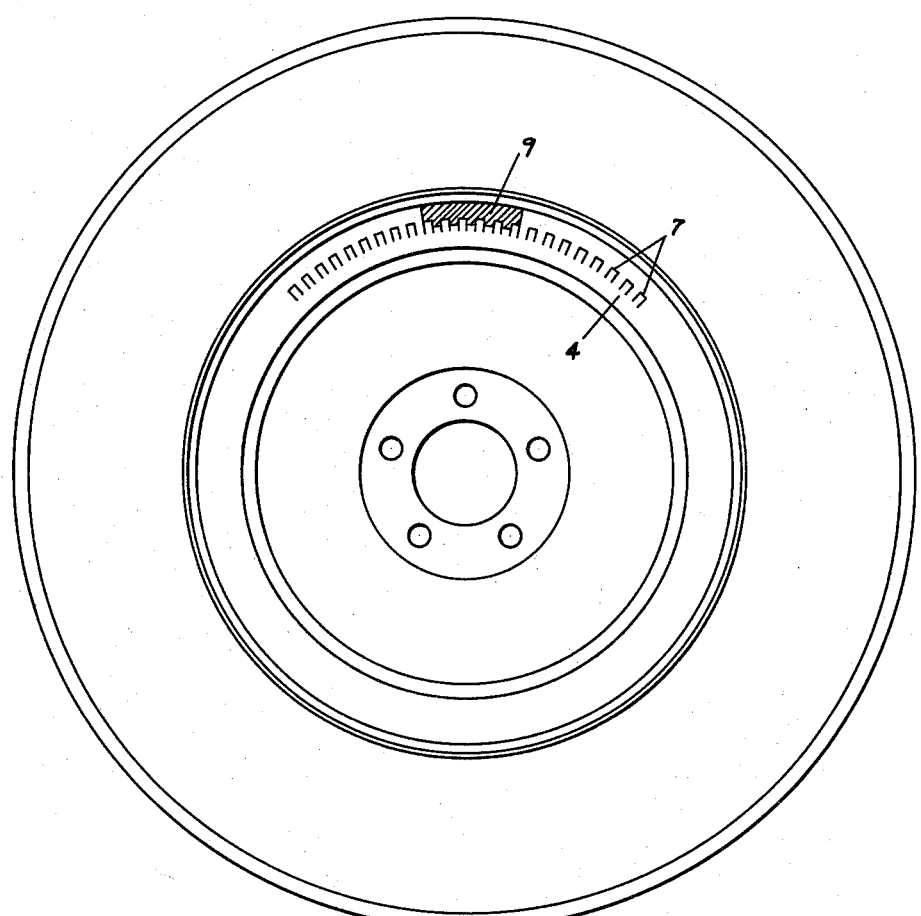
Fig. 1 is a side elevation of a wheel with a balancing structure according to our invention attached thereto.

Reference will now be made in greater detail to the annexed drawings for a more complete description of this invention. The supporting means of the wheel, in this instance shown as a disc, is indicated at 1, while the tire-supporting rim is denoted by the reference numeral 2, and the tire by the numeral 3. These parts are conventional and need no further description.

Figure 2:
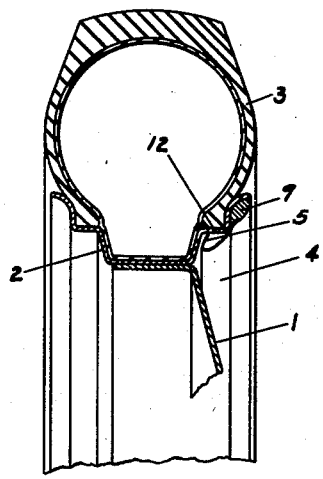
Fig. 2 represents a fragmentary vertical central section through the upper part of Fig. 1.
Figure 3:
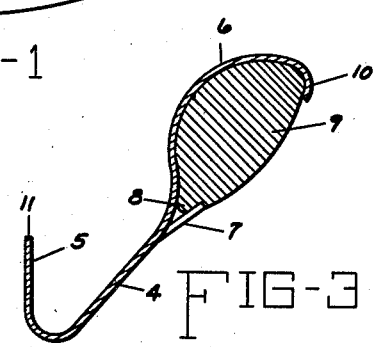
Fig. 3 represents an enlarged section of a balancing weight and its supporting ring.

A ring 4, having parts of its inner edge turned outwardly, as indicated at 5, has its outer part bent, as indicated at 6 in Fig. 3, to fit in a shallow groove in the outer face of the rim 2 so that it rests closely against the outer face thereof. This ring has fingers 7 stamped from the body thereof and bent outwardly to receive between them and the body of the ring the edge 8 of the weight 9. The extreme outer edge of the ring is bent around the outer edge of the weight, as indicated at 10, and, with the fingers 7, holds the weight 9 in place, the weight being formed with depressions for the reception of the fingers 7 which keep the weight from slipping around the holding ring, thus getting out of balancing position. The ends 11 of the rim-engaging fingers 5 engage the outer face of the rim and hold the ring and weight against detachment from the rim. By comparison of Figs. 2 and 3, it will be seen that fingers 5 are distorted when the weight is applied to the rim, thus placing these fingers under tension so that they exert a spring pressure against the shoulder 12 of the rim.

When it is desired to apply a decorative ring to the wheel outside of this balancing weight and its supporting means, this can be done by the fingers of the decorative ring, comparable to the fingers 5, engaging the wheel rim between pairs of fingers 5. When so arranged, the decorative ring will cover the ring 4 and the weight 9 so that all that will be seen is the decorative ring.

It is of course understood that the specific description of structure set forth above may be departed from without departing from the spirit of this invention as disclosed in this specification and as defined in the appended claims.

Having now described our invention, we claim:

1. A wheel-balancing structure comprising a ring, shaped adjacent its outer edge to fit closely in an edge groove of a wheel rim, said ring having along its inner edge fingers which are turned outwardly to engage a shoulder of a wheel rim and hold the ring attached to the rim, the outer edge of the ring being bent over to engage the outer edge of a balancing weight and hold it against inadvertent displacement from the rim, the body of the ring having fingers cut therefrom and bent out to engage a second edge of the weight, the ring fitting in the groove in the outer surface of the rim holding the weight attached to the rim closely adjacent its outer edge.

2. A wheel-balancing structure comprising a resilient metallic ring having fingers formed along its inner edge and bent outwardly for engagement with the exposed surface of a motor vehicle wheel rim, the body of the ring having fingers severed, in part, therefrom and bent away to receive between them and the body of the ring an edge of a balancing weight, the outer portion of the ring being shaped to enable it to fit in a groove of a wheel rim, and the extreme edge of the ring being bent outwardly and backwardly to engage the outer edge of the balancing weight and to assist in holding it attached to the rim.

LE ROY V. JACOBSEN.
GILBERT G. GO SLINE.

REFERENCES CITED

The following references are of record in the file of this patent:

UNITED STATES PATENTS

| Number | Name | Date |
| --- | --- | --- |
| 2,292,528 | Kraft | Aug. 11, 1942 |
| 2,361,406 | Lyon | Oct. 31, 1944 |

FOREIGN PATENTS

| Number | Country | Date |
| --- | --- | --- |
| 380,791 | Italy | June 4, 1940 |